(12) United States Patent
Barnes

(10) Patent No.: US 11,701,815 B2
(45) Date of Patent: Jul. 18, 2023

(54) LAMINATION PROCESS AND USING COATED FIBER CORES TO CREATE AN ADHESIVE LAYER AND/OR A REINFORCEMENT LAYER

(71) Applicant: Dale Barnes, Tuscaloosa, AL (US)

(72) Inventor: Dale Barnes, Tuscaloosa, AL (US)

(73) Assignee: Phifer Incorporated, Tuscaloosa, AL (US)

( * ) Notice: Subject to any disclaimer, the term of this patent is extended or adjusted under 35 U.S.C. 154(b) by 334 days.

(21) Appl. No.: 16/987,189

(22) Filed: Aug. 6, 2020

(65) Prior Publication Data
US 2021/0039307 A1 Feb. 11, 2021

Related U.S. Application Data

(60) Provisional application No. 62/913,841, filed on Oct. 11, 2019, provisional application No. 62/883,895, filed on Aug. 7, 2019.

(51) Int. Cl.
*B29C 64/147* (2017.01)
*B29C 64/118* (2017.01)
*B33Y 10/00* (2015.01)
*B33Y 70/00* (2020.01)
*B33Y 80/00* (2015.01)
*B29K 27/06* (2006.01)
*B29L 23/00* (2006.01)
*B29K 105/00* (2006.01)

(52) U.S. Cl.
CPC .......... *B29C 64/118* (2017.08); *B29C 64/147* (2017.08); *B29K 2023/06* (2013.01); *B29K 2027/06* (2013.01); *B29K 2105/0008* (2013.01); *B29K 2105/0026* (2013.01); *B29K 2105/0044* (2013.01); *B29K 2105/0097* (2013.01); *B29K 2995/0016* (2013.01); *B29K 2995/0026* (2013.01); *B29L 2023/005* (2013.01); *B33Y 10/00* (2014.12); *B33Y 70/00* (2014.12); *B33Y 80/00* (2014.12)

(58) Field of Classification Search
CPC .. B29C 64/147; B29K 2105/0097; B32B 7/12
See application file for complete search history.

(56) References Cited

U.S. PATENT DOCUMENTS

| 7,993,565 B2 * | 8/2011 | Kim ...................... B29C 53/025 156/286 |
| 8,636,868 B2 * | 1/2014 | Yoshizaki ............. B29C 43/203 425/405.2 |
| 2014/0161922 A1 * | 6/2014 | Thompson .............. B32B 37/10 425/405.2 |

* cited by examiner

*Primary Examiner* — James Sanders
(74) *Attorney, Agent, or Firm* — Intellectual Property Consulting, LLC; Bernard F. Meroney

(57) ABSTRACT

The invention includes a method of providing an intermediary layer in a laminated structure, between two adjacent layers, where the intermediary layer contains a fiber having an extrusion coating. The intermediary layer may form a textile constructed from the fibers, the intermediary layer, when the lamination method proceeds, provides the adhesion between the adjacent layers, as well as reinforcement for the laminated structure.

21 Claims, 1 Drawing Sheet

LAMINATION PROCESS AND USING COATED FIBER CORES TO CREATE AN ADHESIVE LAYER AND/OR A REINFORCEMENT LAYER

PRIORITY CLAIM his application claims the priority benefit of U.S. provisional applications 62/883,895, filed Aug. 7, 2019 and 62/913,841, filed Oct. 11, 2019, both of which are incorporated by reference.

FIELD OF INVENTION

The invention relates to forming a laminated structure, which is typically formed of layers of material with adhesives positioned between the layers, where the structure is exposed to a process of one or more of heating, applied pressure, or an applied vacuum, to tightly bond the layers into a monolithic structure, which is then cooled to solidify or set the adhesives.

BACKGROUND

Lamination is the technique/process of manufacturing a material in multiple layers, so that the composite material achieves improved strength, stability, sound insulation, appearance or other properties from the use of differing materials. A laminate is a permanently assembled object composed of layers that are joined together by heat, pressure, sonic or RF welding, and/or adhesives and binders. In current laminate processes, multiple materials are joined in an effort to result in a desired monolithic structure. These processes use a variety of methods to create contact of and adhesion of the multiple layers and the addition of characteristic modifiers. Each layer has a specific role in the formation of an end product that meets the application needs and requirements. In resin layers, components that are of similar nature can be joined by applying the necessary process conditions. In most lamination processes this involves application of one or more of heat, pressure and/or vacuum, and the adhesive. The pressure and vacuum or pressure permit the layered structure to compress for good contact between layers, while heat is used to assist the resin or adhesives, to melt and flow, and the layers themselves to bind to adjacent layers. While these lamination techniques are not all inclusive, they represent processes in which the invention can be used. The invention is usable in all lamination techniques with little or no modifications in the lamination process.

In many applications, a reinforcing layer is included in the laminate structure such as using a fiber reinforced layer. The fiber layer can be orientated fibers, a woven or knitted structure of fiber, a chopped fiber mesh layer, a braided fiber, non-woven oriented fiber fabric, etc., or simple fibers placed in lamination layer, such as by winding the fiber into a layer. The fibers can be mono-filament, staple, multifilament, continuous filament, yarns (multiple threads twisted into a yarn). The fibers are typically composed of thermoplastic resin, glass, carbon, natural fiber, or metals. Fiber layers can also be used for purposes other than reinforcement, such as esthetic purposes or conductivity in a laminate.

The fiber layer may be joined to the adjacent laminate layers with a binder, typically a thermoplastic or thermoset resin compatible with the fiber and the adjacent laminate layers (e.g., will adhere to or encapsulate the fiber and adjacent layers) to create a monolithic structure in the composite object. In some instances, the adjacent layers themselves provide the "resin" into which the fibers will be encapsulated, for instance when the adjacent layers are thermoplastic materials. Additionally, additives or modifiers can be included in the resin to impart properties to the layer and the resulting monolithic composite, such as flame retardants, color components, chemical stabilizers, UV stabilizers, anti-bacterial agents, mildew inhibitors, conductivity and other characteristics.

Many lamination processes today utilize binders that are in the form of granular resins, powder resins, liquid or gel solvents or liquid or gel resins, or films. They are applied in most processes as multi stage singular component applications using spray, broadcast, soaking during the lamination process. Layer components such as fibers can be pre-saturated prior to placement in the laminate layer (including fibers, if present), by wetting the fibers or fiber layer with soaking or sprayed materials. These processes often result in poor bond or adhesion between adjacent layers and the fibers that can result in failure of the laminate structure by layer separation or delamination.

Additionally, when modifiers or additives, such as flame retardants, color components, UV stabilizers, chemical stabilizers, and fillers, are often used in a layer. The current common methods used to disburse and apply binders are also used in applying these modifiers to a layer structure. These current methods are multiphase and are difficult to, or cannot be, well controlled in placement and distribution within the layer and often result in poor or unwanted unpredictable distribution of these modifying materials in these laminate structures. For instance, flame retardant additives, or color additives can easily change in density per-square inch, presenting unwanted product variations across the finished laminate structure.

All current methods result in poor or no control of distribution of these modifying materials in the laminate structures. There is therefore, with present methods, no design capability or control and predictability associated with delivery of a given component to any given portion of the laminate area or control of materials needed for proper cross layer adhesion.

There is a need to modify the lamination process to allow control, predictability and consolidation of the delivery and distribution of a given component to any given portion of the laminate area, including control of additives, reinforcements and/or resin, to promote the desired properties and/or adhesion of the components with the adjacent layers.

The results of current methods are processes and materials that are not capable of controlling cross layer adhesion or additive material distribution which are highly necessary for success in composite structures.

SUMMARY OF THE INVENTION

The invention includes a method of providing an intermediary layer in a structure to be laminated between two adjacent layers, of the structure, where the intermediary layer contains a fiber having a core and an outer extrusion coating. The intermediary layer may form the outer coating melts and flows in the lamination method creating the adhesive to bind the two adjacent layers.

The invention includes where the intermediary layer adds reinforcing fibers to the laminated structure.

The method includes where the intermediary layer forms a textile made from the fibers by weaving, braiding or knitting. the fibers together.

The method includes where the inner core is a thermosetting polymer and the outer surface is an extrusion coated thermoplastic polymer.

DETAILED DESCRIPTION OF THE PREFERRED EMBODIMENT OF THE INVENTION

Figure 1:
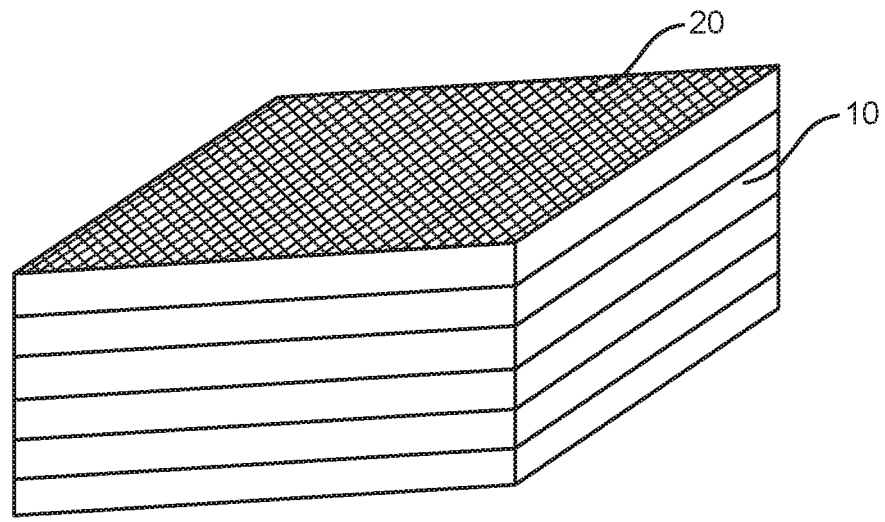
FIG. 1 is as front perspective view of a portion of a structure to be laminated showing a textile intermediary layer.

The improved process uses pre-coated fibers, constructed from manmade synthetic materials, natural materials, and/or metal, glass, meal, or carbon fiber cores. The coated fibers are used to construct an intermediary layer to be placed in the laminated structure. Previous to the placement of the fiber in the laminate, the fiber cores or yarns are coated using extrusion coating methods, and the coated fiber is placed between two adjacent layers, an upper layer and a lower layer. THE fibers are first coated with a coating applied by extrusion coating methods. Extrusion coating of the fiber core with a thermoplastic or thermoset material, creates and results in a bicomponent fiber or filament structure (e.g. core filament and coating). The created bicomponent filament structure, is now referred to as a yarn, which may be further processed by methods including knitting, weaving, braiding, chopping or other manipulations of the coated fiber, to create a "fabric" or "textile" that will be used as the desired layer. Alternatively, a staple (chopped) fiber sheet can be created by chopping the coated fibers, and using this as the intermediary layer.

Additionally, the intermediary layer can result by laying a single yarn of the coated fibers as a standalone bicomponent for the intermediary layer in the laminate structure. The yarn could be laid in a desired pattern, such as zigzag or circular. The fiber textile can result from weaving, knitting, braiding or laying the yarn or staple fiber sheet in the lamination structure as the fiber reinforcement layer in the sequence of the multilayer design of the laminate structure. The fiber coating, if thermoplastic, is preferably chosen to be compatible with the adjacent laminate layers (for adherence) and, preferably, compatible with any additional adhesives that may be used with the intermediary layer, if any. In one embodiment, additional adhesives are not necessary, as the fiber coating may be the only adhesive property needed and used to bind the intermediary layer to the adjacent upper and lower layers of the structure to be laminated in the laminate process chosen. For instance, the application of heat and pressure to bind all the layers in the structure can melt the fiber coating Additives and modifiers can be precisely included in the coating during the extrusion coating, on the intermediary layer and form an adhesive to bind the adjacent layers. The melted and now flowable coating is the needed adhesive, and no additional adhesives may be needed. The coating (if thermoplastic) may also provide for increased bonding of the resulting fibers within the fiber "textile" promoting cross layer bonding.

With extrusion coating, the coating can be controlled to have specified properties, such as even distribution of modifiers. For instance, in extrusion coating, the equipment (screw extrusion) is designed to create a uniform mixing of the materials to be extruded as the coating, creating even distribution of the modifiers/additives in the coating of the fiber. The coating thickness, and physical properties (such as melt temperatures, viscosity, etc., and characteristic modifiers can be varied precisely and controlled during extrusion methods. The fiber fabric can be created using different fiber cores and/or coatings, and woven (for instance) so each strand in the textile has specific properties, enabling modification of properties across and within the textile or fabric. In this fashion the fiber fabric or textile, if used, can be precisely controlled as to what modifiers or fiber cores are present in the fabric, and where they are present. in the fabric. This ability to provide precision engineering of the woven or knitted fiber textile or fabric for the intermediary layer provides a degree of control not possible in the current lamination techniques. The fiber cores may also be varied in the resulting fabric, for instance by placing metal fibers within the fabric (for instance, to be used as an electrical conductor in the fabric and the laminate). Present extrusion coating methods allow for fine control of the yarn coating makeup, such as coating the core material with different resins and/or modifiers in each quadrant of the 360 degrees of the core. Consequently, the coated fiber, in the circle of the coating, can have different characteristics, such, using color as an example, one fourth can be blue, one fourth white, one fourth green, and one fourth is black. One coating layer can be produced with multiple coating characteristics and the different coated regions do not have to be of equal width or arc length. Multiple extrusion passes can be made, allowing for a coating with different characteristics with depth. The coated fiber cores can also be included in the laminate via continuous filament or partial individual strands ("staples") and monofilaments for instance.

The coated yarn, including continuous filament and partial individual strands (staple) thus delivers the components (additives and/or resins) for incorporation into the laminate structure. The coated yarn core type and textile layer (without consideration of the coating) is designed to include the desired fiber properties (such as tensile strength) in the laminate structure.

Figure 2:
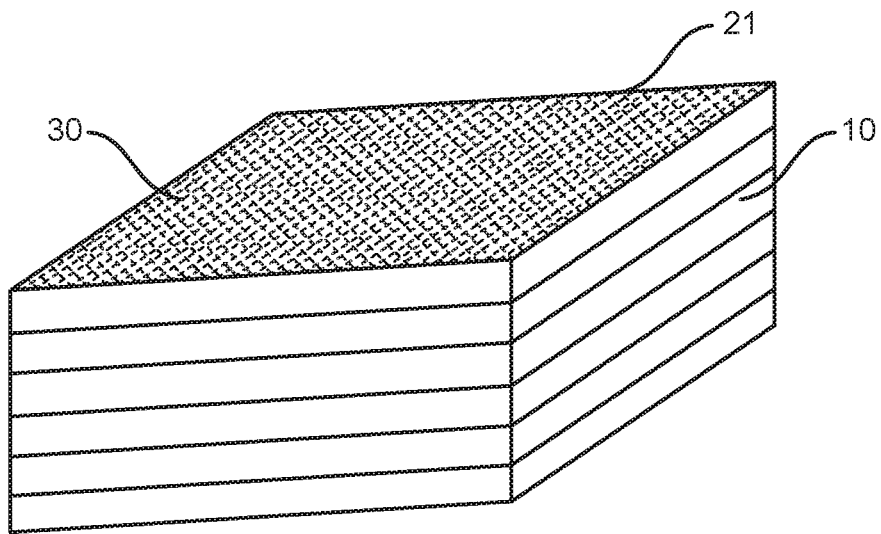
FIG. 2 is a front perspective view of FIG. 1, depicting the intermediary layer after heat has been applied in the lamination process.

The transformation of the intermediary layer during the lamination process is depicted in FIGS. 1 and 2. In FIG. 1, the structure to be laminated is partially depicted, with the lower layer 20 below the intermediary layer 20, where the intermediary layer is a screen like textile woven from extrusion coated core firs, where the coating is a thermoplastic coating. FIG. 2 depicts the structure of FIG. 1 after heat has been applied in the lamination method. The coating on the cores in the textile has now melted forming an adhesion layer 30 in with the remaining textile of the cores 21 (shown in dashed lines) are fully wet out by the melted polymer coating. With an upper structure with the upper layer place above the intermediary layer in FIG. 1 (not shown), the upper layer would be bond to the lower layer 40 after lamination by the adhesive layer 21. Note, the intermediary layer can be utilized between layers anywhere in the laminate structure, and can be used in more than one location in the structure, for instance providing a woven metal textile intermediary layer in one location, and a knitted glass intermediary later in another location. The two layers could employ different extruded polymers as the coating.

In one embodiment, the fiber coating is desired to be a thermoplastic resin that will adhere to the upper- and lower-layer materials adjacent to the intermediary fiber layer. In this case, the lamination process (the applied heat, pressure and/or vacuum applied) will be used to melt the thermoplastic coating and to spread or flow the melted resin further into the yarn fabric, and also to spread the resin into contact with the upper and lower layers adjacent to the fiber layer, to bind the fibers to the adjacent layers to create a monolithic three component layer. In other embodiments, the coating resin can be a thermosetting resin, in which event the adjacent layers themselves bind to each other and the fiber layer, with no additional adhesives employed, or additional adhesives cane used between the fiber layer and adjacent layers during the lamination process. In another embodiment, the coated fibers (for instance, thermoset coated fibers) and the resulting fabric layer can be separately imbedded into a thermoplastic layer creating a fiber film layer that can be used as an added film adhesive for the lamination process and where the characteristics of the fiber will not migrate in the lamination process.

If the coating on the fiber layer is a thermoplastic layer, this layer can be used to distribute the additives of the melted resin coating uniformly throughout the layers in question. In this embodiment, the thickness, melt temperature and viscosity of the coating should be matched with the lamination process to ensure sufficient resin melt to flow and bind adjacent fibers to the intermediary layer, and/or to wet the entire fiber intermediary layer to create a monolithic structure in amination after setting (hardening). During lamination, the flowable melted resin will be forced into contact with multiple filaments of the yarns (if multifilament yarns are employed) and also between adjacent yarns on the intermediary layer. This "wet out" is preferred in enhancing the bond between yarn intermediary layer and adjacent laminate layers.

In alternative embodiments, additional resin or additional or different additives, can be added, such as in sheet resin, or wet or dry product added between the fiber and the adjacent layers prior to or during lamination.

In another embodiment, the coating on some or all of the fiber cores in the fiber layer can be designed to remain on the fiber core during the lamination process. For instance, the coating may have a melt temperature higher than that used in the lamination process, or the coating can be a thermosetting coating. In this instance additional adhesive resin may be employed, if needed, to bind such fibers to the adjacent layers to provide proper adhesion in the layers to bind the fibers and adjacent layers to create the desired monolithic layer. For instance, color, or flame-retardant or other desired property can be added that will remain on the fiber cores and not migrate during the lamination process. As an alternative, the coating could be a two layer coating, where the innermost layer is designed to remain on the core during the lamination process, and the outermost layer is designed to melt and to be distributed in the fiber intermediary layer and function as the adhesive for the lamination process.

In other embodiments, the coating, or the fiber cores or yarns, can be varied across the fiber intermediary layer. For instance, if a particular area of the monolithic layer is to have specific properties different from the surrounding area, the fiber layer can be so constructed by modifying the fiber coating or fiber cores in the area of concern, and the surrounding area constructed with a fiber layer having different coatings or different fiber cores. For instance, if a particular area is to be a colored, the area in question would have properly constructed colored coatings. The coated yarns immediately surrounding the area may be non-colored, or with higher melt temperatures (or thermosetting resin). In the lamination process, the coating color within the area will melt and flow to fill in the desired area, but cannot flow outside the desired area, as the surrounding fibers with coatings with higher melt temperatures do not flow and act as dams. Alternatively, the outer perimeter could use a two layer coating on the fiber core-an inner layer of high melt temperature and characteristics desired of a specific location of the layer and an outer layer of resin with melt temperatures similar to that of a specific interior layer. Different melt, compatibility, and modifier characteristics can then be isolated as designed. In this fashion, multiple areas of the fiber textile can have different properties, where the properties are confined to specific areas. In such a fashion, the fiber intermediary layer can be woven or knitted, much like a textile, to create fiber layer with patterns or areas that are distinct and will remain so after lamination. Alternatively, the fiber coatings can have similar melt temperatures, but different additives or modifiers, and the distinct area of the prior example, will have a small boundary area where the two properties (for instance, color) are blended.

The technique can also be used to form a fiber layer little or with no reinforcing properties.

For instance, the core fiber can be a resin "monofilament or resin multifilament fiber" of thermosetting material is then coated with a thermoplastic coating, and used to create a woven, knitted, braided, cast fiber layer where the fiber cores are entirely thermoplastic (or thermoplastic/thermosetting materials). That is, there is no core metal, glass, carbon core fiber). The fiber intermediary layer, in this case, will be used to carry the thermoplastic coating modifiers or properties as described above. The monofilament fiber If used) core can be a thermoplastic material as a fiber core itself, and it can have different melt temp than the coating placed thereon, so it could be a reinforcement itself like the multifilament yarn. Also, in this way the coating could melt and flow exposing the thermoplastic monofilament to the required heat and pressure causing the monofilament resin to flow and no longer have a visible shape or presence in the laminate layer. In this way the coating and the cores have contributed designed attributes to the laminate layer in which they are cast and not be present in any yarn or fabric form in the final laminate layer.

The invention uses existing extrusion techniques to coat the desired cores. Extrusion coating of monofilaments, wires, multifilament, or yarns as cores is well known in the industry. Further lamination process employed using coated fibers require no changes in method or machinery used to coat the yarn, or the methods used in the selected lamination process.

As can be seen, an advantage of the present invention, when the fibers cores are coated or the fiber core is a thermosetting resin (without a coating), is that the resulting material allows one to control the quality and quantity of the resin or modifiers desired within the fiber layer. This allows precise control of or bond strength, reinforcement, and modifier distribution to take place in a controlled and predictable manner in the fiber layer and hence the laminate.

Total coverage and control of the resin is needed to form laminate strength for the prevention of delamination. The inclusion of a specified coated core type in laminates using a specific blend of coating ingredients will result in improved control of available ingredients, improved homogenous coverage, improved modifier distribution and encapsulation, flexibility of ingredient recipe, lamination strength, design assurance, reduction of manufacturing raw materials, reduction of process time, and reduction of scrap and below grade product. The process allows repetitive predictable results, improved efficiencies, reduces capital requirements with improved forecast capability. The invention will create new opportunities for additive and enhancement materials to be explored and included in the early design stage of any laminate product. No significant change is required of any processing system using a bare yarn or filament in the lamination process. Laminate structure processes being designed initially will necessitate the inclusion of machinery for application of braided, woven, wound, or laid up coated yarn structures or monofilament structures, within or prior to the lamination processes. No current lamination process or other methods utilizing bare yarns and or monofilaments and individual modifier components offer the advantages of the invention.

Typical fiber cores include glass, metals, aramid, carbon, polymer plastics such as nylons, TPU, polyesters TPO, acrylic, PLA, EVA and natural fibers such as viscos, cotton and wool, and others. Typical coatings include, polyesters, PVC, TPE, TPU PE, TPO, polyamide and other thermoplastics. Acrylic, polycarbonate thermoset materials like epoxies, acrylics, polyurethanes, phenolic and others may also be used as a coating or the fiber core.

Composite laminated materials can be used for products, including hoses, pipes, conveyor belts shoes injection molded parts, thermo formed parts, wire and cable, tubing, engineered textiles (i.e., rain gear), ballistic composites, security glass, reinforced panel structures for building applications, reinforced or backed flooring, molded marine boat structures, geotextile composite fabrics, chemical and heat resistant panel and composite fabrics and medical components, structural fabric (tension structures like domes for stadiums), organic material composites, reinforced or enhanced foams, metal composite structures like stainless laminated to wood or paper, or steel laminated to wood, energy transmission, (a conductive fiber coating is an embedded conductor (such as a resin with conductive additives) or a monofilament that has a copper wire core, stress concrete laminates (power poles).

As an example, consider a high pressure braided reinforced multi-layer multi-component hose composite. Primary use for this hose is hydraulic fluid transport and water transport. Consider such a hose with three layers.

The inner layer is a tube extruded of TPU thermoplastic; the middle, layer is a 1000 denier high tenacity polyester industrial yarn of natural color commonly and widely available material; and outer layer is an extrusion coating using TPU thermoplastic resin. The outer layer can be extruded onto the prior two. Attempt at lamination takes place in an extruder during the application of the final coating over the initial two layers, applying heat and pressure. No additional resins are utilized. In this instance, the lamination technique is the extrusion process.

In this example the inner tube can be extruded on a cylindrical mandrel as is done in common extruded tubing practice today. In a separate process the tube is then introduced into a common over braid machine and the tube is over braided with a 1000 denier high tenacity polyester yarn in a form and structure that is designed for the needed burst strength. This creates a two-layer polyester braid covered tube.

The two-layer fiber covered tube is then introduced into an extruder. The third and final outer layer of TPU is applied as a coating over the two-layer braid covered tube using standard industry extrusion equipment and methods. As the two-layer tube flows through the extrusion process, molten resin in the extruder and die is available and encapsulating the braid covered tube. The molten resin, via pressure and heat in the extrusion process attempts to create flow of the molten resin within and through the yarn and braid structure. In this way the core TPU tube outer surface is also exposed to heat of the extrusion process and can reach a partial melt that will intermingle with the yarns and the TPU resin made available during the extrusion of the final coating. In this example the goal was to provide adhesion so as to improve final bond strength between layers. Bond strength is necessary to high pressure hose performance in the expected application of the final hose. The inventive method allows a more homogeneous monolithic structure to be created via the outer layer coating flowing from the yarn surface and co-mingling with the core inner layer surface, so the inner layer, out outer layer encapsulating the yarn intermediary layer thereby create the more desirable homogeneous monolithic structure which is required to improve final product performance.

The new "hose" utilizing the process uses the previously utilized TPU material to form the inner tube and outer coating layers. The middle layer is now the inventive component as a coated polyester yarn layer, coated in a separate extrusion with TPU, where the TPU coated yarn, in this non-limiting example, was approximately (by weight) 80% TPU resin coating and 20% yarn The TPU was separately and previously applied to the yarn using a common industry standard thermoplastic extrusion yarn coating process. In this process a standard 2" extruder utilizing a mixing screw and standard barrel configuration were used. The polyester yarn is pulled through the extrusion and take-up process by precision cross wind machinery. The yarn moves at speeds of but not limited to 500 meters per minute through the process. The extruder utilizes a vacuum supply system to deliver TPU resin in pellet form to the extruder barrel and screw. Once introduced the resin is subjected to the pressure of the flights of the screw forcing the resin against the barrel wall creating sheer heat and pressure. As the screw transports the resin down the barrel it sees zone temperatures of, but not limited to, 325° C. in four areas of the extruder. The screw ultimately delivers the molten resin to the die. The polyester yarn is introduced into the die via a tube die hat is immersed in the die cavity with molten resin. In the die the yarn exits the tube for a short distance and emerges from the die system. A second die tube contains molten resin in an area between the outer surface of the yarn tube and the inner surface of the extruder die tube. The resin is expelled via this gap in relationship due to the pressure in the die and correlates to the speed of the withdrawal of the yarn. As the yarn exits the die, it is located in the center of the tube created by the gap between the two die sets. As the yarn and the resin tube leave the die, vacuum pressure is placed on inner portion of the resin tube and it collapses to encapsulate and bond to the yarn component. The now two component structure of a coated yarn enters a water bath and is cooled to allow the thermoplastic to set to the desired shape. The coated yarn is accumulated onto a bobbin suitable for use in the desired yarn process of over braiding. This resin had no specific modifiers for additional coating characteristics.

In the example above, the inner tube (placed or formed on a mandrel) was created as was done in the original method and is fed into a braider. In this process the yarn, now the TPU coated poly yarn, is braided around and on the inner tube making a coated fiber covering. All the braiding processes employed are commonly widely used and standard techniques and machinery and while not limited to, are similar to the original process.

This two-layer coated fiber covered tube is then run through an extrusion process that coats the fiber covered tube. The two-layer tube may be introduced into an extruder and the outer layer of TPU is extruded using standard industry methods, as an outer covering resulting in a final hose structure approximately of ½ inch OD. In this final layer extrusion, the extrusion environment, and the deposited melted TPU will be hot enough to melt the TPU coating on the fiber layer. The pressure of the extrusion process provides the force to drive the molten resin from the yarn through to the inner tube of layer and into the molten resin of the final layer. Consequently, the final extrusion process created the desired monolithic three-layer structure. In this instance, an autoclave process step is not needed for lamination. The extrusion of the outer layer performs two functions, placement of the outer lamination layer, and lamination of three layers.

For the Hose Example:

A standard 2-inch single screw extruder with a general purpose screw is used. The extruder is fed resin PVC, TPU, PE PP etc. from a vacuum system that removes the resin from the package and delivers it to a metering device. The metering device supplies the resin at a predetermined rate so that new resin is introduced into the barrel at the rate the finished resin leaves. It is a replacement system. Once the resin is delivered into the barrel it is transported down the barrel by a screw that forces the resin against the wall of the barrel and against the flights of the screw itself. The barrel is heated by a series of heaters that control temperature in different zones or areas of the barrel. In this case there are 4 such zones. The temperature is increased per zone as the resin is transported down the barrel via the screw. In this way the resin progressively melts until it is molten, and the proper viscosity level is reached. Each resin is different. The screw also impacts the resin with shear. In this process the pressure of the screw flights presses the resin against the barrel. This pressure and friction add to the heat to melt the resin. As the screw turns it transports resin along down through the process. Once it is the proper viscosity, the resin is forced by the screw into an extrusion head. These are specific and detailed and designed to move the resin into some sort of distribution system to leave the process. In this example the resin is distributed around a hollow tube die hat contains the braid covered tube. The tube leaves the hollow tube inside the die head and is exposed or immersed in the molten pool of resin. Pressure from the system forces resin between the gap of the hollow tube and the die face. The resin only comes out between the outside of the die and the outside of the tube hereby forming a sheath or tube. or jacket. In this case that tube has a braid covered tube inside. As the tube is formed and moves out of the die, the inner tube is fed at the same rate. As they leave, the newly formed tube is collapsed via vacuum onto the inner tube as it cools. It is then passed immediately into a cooling process which is usually water. The resin cools before it can deform and takes its final shape, in this case a round tube.

In another example, the coated yarn is positioned on the mandrel, without an inner tube. This shaped coated yarn is introduced through the same extrusion process. This results in the yarn being coated by the exterior extruded tube. The mandrel may be coated, for instance with a film that allows for easy release of the two-layer tube from the mandrel.

The temperatures range radically per resin and application. In this TPU example the zones are approximately all set at 345 degrees F. The screw is not heated but actually absorbs heat from the resin and barrel heat. The die can have zones but for this purpose the die and head have approximate temps of 325 F and die at 345 F. The speed for yarn coating is about 500 yards per minute. To create the tube both the first one and the final one that is the outer coating, is about 10 yards per minute. The difference is due to the amount of resin being run out the end of the die. The coating is generally only few mils thick. The tube here is about ⅛" thick. The outer coating tube here is about ¹⁄₁₆".

Almost all thermoplastics are extruded in this way. The difference is what happens at the end of the extruder barrel and the molten resin it is delivering. Injection molding is just that, the molten resin is injected into a mold where it cools and takes the shape of the mold. In our examples the coated yarn would be placed in the mold previous to the resin being injected. When the resin is injected the yarn coating melts and flows just as in our other examples. The yarn stays put and is now encapsulated in the resin and is the reinforcement in the molded part. Our invention has the same advantages here as previous examples.

The goal was to improve the adhesion of each layer to the other The TPU coating on the fibers flowed and mixed with the melted inner and outer layers using the heat and pressure in the extrusion process. A more homogeneous monolithic structure was created.

Layers 1 and 3, instead of being extruded onto the mandrel, may be each formed by a film extruded layer that is tightly wrapped onto the mandrel (layer 1) or wrapped around the prior layers (for layer three). A protective outer wrapping can also be employed.

As an additional example, flat layer laminates such as reinforced belts and sheets require separate structures to perform in a monolithic way and contain many varied performance enhancement additives. In one current application processes, the material is a reinforced sheet of extruded PET film. As currently preformed, the first layer film is a standard commercially available material of a variety of thickness. The inner layer is a laid pattern of— non-coated aramid yarn. The next layer is a granular adhesive. The final layer is a PET film commercially available and of a variety of thickness. In this current lamination process the initial layer is spread over a wooden form the shape of a custom triangle. The triangle represents the shape desired to perform the required function, to trap wind in a specified way. The second layer of the aramid yarn, which can be of various sizes, is placed on the film layer by a hand process in an engineered pattern to provide strength. The next layer is the application of a granular custom adhesive. The adhesive is spread by a hand method across the film/ yarn layer. The final layer is a PET film that is of the same shape and type as the first layer film. The 4-layer product is then exposed to radiant heat by a portable heater that is moved across the film at a specified speed and temperature based on the film and adhesive needs. As the structure is heated it is pressed by a series of rollers that travel under the heat source. With the proper heat and time as dictated by the specific film and adhesive resin, the film begins to become partially melted and the granular adhesive melts. With the applied pressure the melted adhesive granules spread and cover the entire inner surface of the stacked film and yarn structure. As the heat and pressure are removed the film and adhesive return to the stable state and the three layers are adhered (laminated). This method is not successful at providing the most effective results due to the inability to control the granular adhesive placement, size, uniform spread, and uniform thickness. The result is a laminate structure that is not homogenous and has great variation of resin distribution and thickness leading to unpredictable performance and longevity.

In the improved process, the initial fiber layer is produced and placed on the structure to be laminated in the same assembly process as is currently done. The yarn layer is now an aramid yarn of various sizes that has been previously extrusion coated with the same adhesive resin as is represented in the previous example. The resin is coated evenly as desired on the yarn and is controlled and produced using current extrusion methods and equipment commonly used today to coat yarn with thermoplastic resins. Thickness of coating and control of coating consistency is designed and controlled using current common equipment and methods for extrusion of thermoplastics coatings on yarns. The thickness of the resin coating is designed so that when melted, it will merge with melted resin from adjacent yarns to produce substantially complete wet-out.

The coated aramid yarn is then placed by hand in the engineered pattern as desired for maximum performance of required strength. The third layer of PET film of the same shape and of the desired type and thickness is then placed on the form creating a 3-layer structure. Heat and pressure using a portable heat and pressure source as used by the previous method may be used to melt and press the resin to spread and over the entire surface. This way has improved control and all other aspects as mentioned above.

In current laminate processes, multiple materials are joined in an effort to construct a desired monolithic structure. These processes use a variety of methods to create contact of and adhesion of the multiple layers and the addition of characteristic modifiers. Each layer has a specific role in the formation of an end product that meets the application need and requirements. In resin layers, components that are of similar nature can be joined by applying the necessary process conditions. In most applications this involves heat and pressure and vacuum and or chemical bond (glue). While these are not all inclusive, they represent the process in which the invention can be used. The methods used today require the process to use materials that can and do promote the resulting monolithic layered structure in order to be successful. Many processes today use such as granular resins, granular or liquid glue, wet solvents, preparation via wetting fibers with soaking or sprayed materials. These processes often result in poor bond between layers and result in failure of the product produced. This is generally referred to as delamination. Color components, Flame Retardant materials, fillers, chemical stabilizers, UV stabilizers and other components must be applied in the methods mentioned. All current methods result in poor or no control of distribution of these modifying materials in these laminate structures. There is therefore, via todays methods, no design capability or control and predictability associated with delivery of a given component to any given portion of the laminate area or control of materials needed for proper cross layer adhesion. The results of current methods are processes and materials that are not capable of controlling cross layer adhesion or additive material distribution which are highly necessary for success in all composite structures.

The components of the invention are used to deliver materials via coatings on yarns that improve all aspects of the composite. The yarn can be included in the composite structure via braiding, weaving, and spiral or random laid up processing. The coated yarns can be included in the laminate via continuous filament or partial individual strands (staples) and monofilaments. The process for using the coated yarn will require no radical changes in method or machinery versus the use of uncoated yarns in the lamination process. The use of bare yarns is for reinforcement and strength as well as visual appeal or physical purpose. The Coated yarns invention will provide these benefits and provide others when designed for the specific need. The coatings may be applied to PET PP PA Fiberglass Carbon fiber and other man-made filament and spun yarns, and monofilaments. The method of application will be resin and product dependent and can involve both extrusion coating with liquid thermoset resins or extrusion coating processes using thermoplastic resins such as PVC, TPU, PE and others that meet the requirement of the specific laminate and compatibility of the other layers of the laminate structure. By using these methods, the resin can be modified when created to contain critical elements such as flame retardants that have no current vehicle for inclusion into the current system other than being inherent to the fiber used. The fiber does not contribute flame retardant to any portion of the structure that it does not touch. Flame retardant and other modifiers can be spread to other portions of the laminate layers when melted or pressed and spread from the yarn coating to other areas of the adjacent layers. This process to design and apply custom modified blends of materials dosed and distributed into the resin as it is applied to the yarns offers the opportunity to design such modifiers to allow for the desired amounts to be in place in any given area by control of heat for resin flow and vacuum and or pressure and the quantity of resin available as a yarn coating. In this way the invention greatly improves delivery of any desired characteristics to any given laminated layer in which the coated yarn is utilized. In the need for reinforcement as well as enhancement, the use of yarns coated with similar materials as the layers will allow for improved adhesion. During the invention coating processes the resins are forced into contact with multiple filaments of the yarns. This "wet out" is important in enhancing the bond between yarn and laminate layers The yarn once coated and placed in position will allow for resin to flow from the surface to the adjacent layers and will remain in contact with resin deeply embedded into the individual filament structure of the yarn. The result is a significant improvement in resin and modifier distribution and resulting bond and is not possible using other techniques. An additional advantage of the invention is to control the quantity of the resin and modifiers desired when the yarn is coated and can then allow for the bond strength and modifier distribution to take place in a controlled and predictable manner. Total coverage and control of quantity is critical to laminate strength, modifier encapsulation and the prevention of delamination.

As a summary, the invention, the inclusion of a specified coated yarn type in laminates using a specific blend of coating ingredients and core fiber will result in improved control of available ingredients, improved homogenous coverage, improve modifier distribution and encapsulation, flexibility of ingredient recipe, lamination strength, design assurance, reduction of manufacturing raw materials, reduction of process time, reduction of scrap and below grade product. It will allow repetitive predictable results, improve efficiencies, and reduce capital requirements with improved forecast capability. The invention will create new opportunities for additive and enhancement materials to be explored and included in the early design stage of any laminate product. No significant change is required of any processing system using a bare yarn in the lamination process. Laminate structure processes being designed initially will necessitate the inclusion of machinery for application of braided, woven, wound, or laid up coated yarn structures within the lamination processes. No current lamination process utilizing bare yarns or other methods offer the advantages of the invention.

As described, the invention increases distribution of additives, and provides a consistent bond between opposing layers in a laminated structure. Note, the system can also be used where distribution of additives is not a concern, for instance, in the hose example where consistent strong bonding between fibers and adjacent materials is provided by the system and methods, and additives were not used on the composite.

For instance, radial tires is an lamination application where the invention could be used, where the nylon cord yarn or the polyester yarn would be extrusion coated with the resin, it would be woven into the mesh used to implant into the tire. The coating would act as it should during the vulcanization of the tire (the lamination process used). The vulcanization process utilized in conjunction with the die is used to shape the tire would create the desired laminated structure.

Finally, a modified process can be used where reinforcement is not needed. In this case, the core yarn is basically the resin itself, with additives formed into a cylinder, that is a core free thermoplastic yarn, or where the core and coating are identical, formed by extrusion coating. The yarn is the coating. This yarn could be used as a above to form a resin yarn "fabric: for purposes of laminating two layers together with a selected distribution of additives.

As an alternative, the intermediary yarn cold be positioned on top of the structure, and a clear polymer film positioned above as the final laminate surface. The lamination process will thus leave the intermediary layer visible, through the cleat uppermost layer, where the ability to control surface variations, such as color, in the intermediary layer, present new design alternatives. not available in prior methods.

The invention claimed is:

1. In a lamination process using heat, vacuum and/or pressure to laminate a series of layers and adhesives into a monolithic bonded product in the lamination process, a method of providing an adhesive layer between two adjacent layers in the structure to be laminated, an upper layer and a lower layer, the method comprising the steps of:

positioning an intermediary layer between the upper and lower layers, where the intermediary layer comprises at least one fiber comprising an inner core and an outer surface comprising an extrusion coated polymer, comprising a solidified extruded polymer that is meltable and flowable when melted, the extruded polymer adapted to bind the upper and the lower layers, the process further comprising the steps of continuing the lamination process to thereby melt the extruded polymer coating and cause the melted polymer to flow between the upper and lower layers, thereby forming an adhesive intermediary layer therebetween, such that at the completion of the lamination process, the upper and lower layers are bonded together in the laminated structure.

2. The method of claim 1 wherein the fiber core comprises a thermoplastic polymer, or a thermosetting polymer, or glass, or carbon, an aramid, metal, or a natural fibrous material, thereby providing reinforcement in the intermediary layer for the resulting laminate structure.

3. The method of claim 2 wherein the fiber comprises a monofilament, or a multifilament.

4. The method of claim 1 where the intermediary layer is formed from a chopped coated fiber.

5. The method of claim 1 wherein the polymer extruded coating comprises a thermoplastic resin.

6. The method of claim 5 where the resin comprises at least one of PVC, TPU, polyesters, PVC, TPE, Polyethylene.

7. The method of claim 6 wherein the polymer further comprises at least one additive.

8. The method of claim 7 wherein the additives comprise one or more of a UV inhibitor, a flame retardant, a thermal stabilizer, a colorant, or an antistatic agent.

9. The method of claim 1 where the at least one fiber comprises a series of fibers.

10. The method of claim 9 where the intermediary layer further comprises a textile formed from orientated fibers.

11. The method of claim 10 wherein the methods for textile forming include, a weaving, knitting or braiding process, forming a chopped fiber layer, a mesh layer, or forming non-woven oriented fibers.

12. The method of claim 10 wherein every fiber in the series of fibers are not formed from identical materials.

13. The method of claim 12 where each fiber in the series of fibers is coated with an extruded polymer, but where the extruded polymer coatings are not identical on each fiber in the series of fibers.

14. The method of claim 1 where the melted and flowing polymer wets out the intermediary layer.

15. The method of claim 1 wherein the structure to be laminated is a hose.

16. The method of claim 1 where the inner core and extrusion coating are formed together in a single extruded polymer layer.

17. The method of claim 1 where no adhesives are added between the intermediary layer and the adjacent upper or lower layer.

18. The method of claim 1 where the intermediary layer further comprises a second fiber, with no polymer outer coating.

19. The method of claim 1 wherein the inner core has a first weight percentage by weight of the fiber, and the outer surface of an extruder polymer has a second weight, percentage by weight of the fiber, where the second weight percentage by weight of the fiber exceeds the first weight percentage by weight of the fiber.

20. The method of claim 1 wherein the upper layer is the top layer in the laminated structure and the upper layer is transparent.

21. The method of claim 1 wherein the outer coat comprises a first layer of a first extrusion coated polymer and a second layer of a second extrusion coated polymer.

* * * * *